United States Patent Office 3,285,750
Patented Nov. 15, 1966

3,285,750
CHEWING GUM COMPOSITIONS HAVING LOW ADHERENCE WHEN DISCARDED AND METHODS OF PREPARATION THEREOF
Haruo Ishida, Hirakata-shi, Japan, assignor to Daiwa Chemical Industries, Ltd., Osaka, Japan, a corporation of Japan
No Drawing. Filed Mar. 9, 1964, Ser. No. 350,534
15 Claims. (Cl. 99—135)

This invention relates to a novel chewing gum base, and to a process for producing said base. More particularly, this invention relates to a novel chewing gum base containing polyolefin powder or fluorine contained resin powder as an adhesion resistant agent and to a process for preparing said chewing gum base.

Once consumed and discarded, chewing gum is a public nuisance due to its strong adhesion to various surfaces. The removing of such discarded chewing gum encounters great difficulties and stains on apparel and the like, defy removal, thus leaving undesired ugly marks. These drawbacks are caused by the adhesive property of the chewing gum base.

It is an object of the present invention to lower the adhesion of chewing gum by providing the chewing gum base with low adhesive properties. By chewing gum base is meant the gum composition before addition of sugars, flavoring agents, and the like. This gum base is a composition comprising the gum component, plasticizers, and fillers which remain after chewing. The chewing gum base is required to have suitable visco-elastic and adhesive properties to provide desirable chewing gum characteristics. One of the essential requirements of chewing gum is a good oral sensation besides taste and flavor.

According to the present invention, the chewing gum base is prepared by admixing as an adhesion resistant agent, a polyolefin such as polyethylene and polypropylene, or a fluorine containing resin such as polytetrafluoroethylene or polytrifluorochloroethylene, preferably in a powder form with materials used for preparing conventional chewing gum base.

As obvious to those skilled in the art, the conventional chewing gum base is a resinous gum component, such as chicle gum, or polyvinyl acetate and plasticizers or a mixture of these components. Other resinous gum components such as jelutone rubber, ester gum, polyisobutylene and the like or a mixture of these are also used. The resinous gum component is frequently combined with a plasticizer such as dibutyl phthalate or butyl phthalyl butyl glycolate and a filler. Even when the composition of resinous gum material is varied, the effect of the present invention upon the reduction of the adhesive property of the chewing gum base does not show appreciable change.

Polyolefins and fluorine containing resins used as an adhesion resistant agent must be high molecular polymers with mean molecular weights ranging from about 3,000 to 100,000. As for particle size of these adhesion resistant agents, powder form is employed. In general the finer the powder, the greater the adhesion resistant power. A fineness of more than 100 mesh can be used, but from the point of feel of the tongue, a fineness of more than 300 mesh is preferable. As for the shape of the adhesion resistant agent, irregularly ground particles are more effective than spherical particles. Thus irregularly ground particles which produce smaller apparent densities (weight per unit volume) than ground particles of spherical shape, have greater adhesion resistant effect. It is speculated that this is due to the greater surface area of the irregular particles. The apparent density therefore imparts favorable effects when it is smaller. Accordingly, the adhesion resistant effect can be estimated based on the apparent density of the powder and the particle size.

The reason that the compounding of a polyolefin or a fluorine-containing resin powder lowers the adhesive property of the chewing gum base may be due to the following phenomenon. The surface of the polyolefin powder or the fluorine-containing resin powder does not adhere to the gum base, thus the surface tension of the gum material exerts a constant force so as to displace the powder of the polyolefin or resin toward the surface of the gum material. In consequence of this, the concentration of the powder of the polyolefin or resin becomes greater in a surface zone than in the inner zone and ultimately the polyolefin or resin powder pentrates the surface of the chewing gum base. By reason thereof, the adhesive property is greatly reduced. In other words the poylolefin powder performs a function of reducing the adhesion area of the chewing gum base. Thus during chewing, the polyolefin particles are uniformly distributed in the gum base so as not to affect the properties thereof, however, when chewing stops, the surface tension of the gum material causes the polyolefin particles to migrate to the surface where they reduce the adhesion area of the base and diminish its adhesive property.

As obvious from the foregoing, the adhesion resistant agent must be a substance having a weak adhesive property in relationship to the chewing gum base. In addition, it should be a material having resistance to water and sputum and which does not affect physical properties such as dissolution, swelling, and softening, when admixed with a plasticizer of a chewing gum base. Furthermore, it should possess mechanical strength sufficient to withstand mastication and have sufficient elasticity so as not to alter the characteristic touch to the teeth, and further have properties such as being non-toxic, tasteless, odorless, and the like.

The adhesive resistant agent of the present invention such as poylolefin powder and fluorine-containing resin powder are quite satisfactory additives in this regard.

The addition of the adhesion resistant agent should be in an amount from 2 to 50 parts by weight, preferably from 5 to 30 parts by weight, and most preferably from 10 to 20 parts by weight per 100 parts by weight of chewing gum base.

The admixing of the adhesion resistant agent with a conventional chewing gum base is performed in a suitable mixing apparatus such as a kneader.

The adhesive property of the chewing gum bases prepared in accordance with the present invention were compared with the adhesive property of conventional chewing gum bases which did not contain any adhesion resistant agent. The testing method was one in which chewing gum bases were pressed onto moquette fabrics, left at a temperature of 37° C. for 30 minutes, and thereafter removed, the resistance to removal being measured. The chewing gum bases of the present invention had much less adhesive characteristics without affecting the other properties required for good chewing gum bases. The result of the test is summarized in the following table in which a conventional chewing gum base made of 82 parts by weight of polyvinyl acetate (the supplier and brand: Kanegafuchi Kagaku Kogyo Kabushiki Kaisha, KBK resin O-345) and 18 parts by weight of dibutylphthalate, and chewing gum bases of the present invention were made by compounding 100 parts by weight of conventional chewing gum with various amounts of 300 mesh polyethylene powder, and kneading. The polyethylene powder used was irregularly ground particles of a high pressure process product having a density of 0.921, a melt index of 1.5, an apparent density of 0.2, and a void content of about 75 percent.

TABLE—AMOUNT COMPOUNDED, READINESS-OF-REMOVABILITY PROPERTIES AS GUM (DETACHABILITY)

| PHR: | | |
|---|---|---|
| 0 | Extremely adhesive | Superior. |
| 2 | Adhesion is reduced | Do. |
| 5 | Partly adhesive | Do. |
| 10 | Completely removable | Do. |
| 15 | ----do---- | Do. |
| 20 | Did not adhere | Do. |
| 25 | ----do---- | Slightly inferior. |
| 30 | ----do---- | Do. |
| 50 | ----do---- | Inferior. |
| 100 | ----do---- | Do. |

NOTE: PHR means parts of polyethylene powder per 100 parts of chewing gum base.

As shown in the above example, compounding of only 2 parts polyethylene powder readily reduces adhesion. At 5 PHR adhesion is notably reduced and at 20 PHR, the chewing gum base does not adhere.

The chewing gum base of the present invention can also be processed into a chewing gum product by the customary method used with regular chewing gum base; for example, addition of flavorings, colorants, sugars, etc., shaping into sheets, cutting into slabs, enveloping and packaging for shipment.

In order that those skilled in the art may more fully understand the nature of my invention and the method of carrying it out, the following examples are given.

*Example 1.*—100 parts by weight of chicle gum are heated in a resin heater at a temperature of 50° C. for about 10 hours and softened sufficiently. The softened gum is charged into a chicle kneader together with 15 parts by weight of 300 mesh powdered polyethylene and subjected to kneading at a temperature of from 90° C. to 100° C., for 40 to 50 minutes. Subsequently flavorings, colorants, sugar, etc. are added to the gum kneader and kneading is continued for another 30 to 40 minutes. By use of an injection molding machine and an injection shaping roll, the kneaded mass is molded into sheet form, cut into slabs by a cutting machine and packaged for shipping as products.

By the addition of polyethylene powder or fluorine-containing resin powder, the discarded chewing gum after mastication does not adhere to building, furniture, apparel or various surfaces, and is readily removed from them even when pressed into contact therewith, while the gum retains its desirable properties such as touch, taste, fragrance, etc.

*Example 2.*—To 100 parts by weight of chewing gum base consisting of 80 parts by weight of polyvinyl acetate resin (KBK resin O–345), 10 parts by weight of natural chicle, and 10 parts by weight of butyl phthalyl butyl glycolate, 10 parts by weight of polyethylene powder and 5 parts by weight of polypropylene powder are admixed and subjected to kneading so as to produce a chewing gum base. When this gum base is pressed onto moquette fabrics at a temperature of 37° C., it does not adhere to the fabrics. The discarded chewing gum prepared in this method does not adhere to various surfaces.

*Example 3.*—A chewing gum base is made by admixing 80 parts by weight of polyvinyl acetate (KBK resin O–345), 15 parts by weight of dibutyl phthalate, 5 parts by weight of calcium carbonate, 10 parts by weight of polyethylene powder and 2 parts by weight of fluorine-containing resin, followed by kneading. When this gum base is pressed onto moquette fabrics at a temperature of 37° C., it does not adhere to the fabrics. The discarded chewing gum prepared in this method does not adhere to various surfaces.

*Example 4.*—A chewing gum base is made by admixing 80 parts by weight of polyvinyl acetate (KBK resin O–345), 20 parts by weight of dibutyl phthalate, 15 parts by weight of polypropylene powder or 10 parts by weight of fluorine-containing resin. This gum base does not adhere to moquette fabrics even when pressed onto the fabric at a temperature of 37° C. The discarded chewing gum prepared in this method does not adhere to various surfaces.

What is claimed is:

1. A chewing gum composition which comprises a resinous base composition and at least one adhesion resistant agent in powder form homogeneously mixed in said base composition and selected from the group consisting of polyolefin and fluorine-containing resin, the said agent being present in an amount of between 2 to 50 parts by weight per 100 parts by weight of the resinous base.

2. A chewing gum composition as claimed in claim 1 in which the adhesion resistant agent is present in an amount of from 5 to 30 parts by weight per 100 parts by weight of the resinous base.

3. A chewing gum composition as claimed in claim 1 in which the adhesion resistant agent is present in an amount of from 10 to 20 parts by weight per 100 parts by weight of resinous base.

4. A chewing gum composition as claimed in claim 1 wherein the resinous base composition is constituted by a plasticizer, and a gum component selected from the group consisting of chicle gum, polyvinyl acetate, polyisobutylene, jelutone rubber, ester gum and mixtures thereof.

5. A chewing gum composition as claimed in claim 1 wherein the resinous base composition is constituted by a gum component and a plasticizer selected from the group consisting of dibutyl phthalate and butyl phthalyl butyl glycolate.

6. A chewing gum composition as claimed in claim 1 wherein said adhesion resistant agent has a molecular weight range of between 3,000 to 100,000 and an apparent density of about 0.2.

7. A chewing gum composition as claimed in claim 1 wherein said adhesion resistant agent has a maximum particle size which will pass 100 mesh.

8. A chewing gum composition as claimed in claim 1 wherein said adhesion resistant agent has a maximum particle size which will pass 300 mesh.

9. A chewing gum composition as claimed in claim 1 wherein said adhesion resistant agent is selected from the group consisting of polyethylene, polypropylene, polytetrafluoroethylene, and polytrifluorochloroethylene.

10. A chewing gum composition as claimed in claim 9 wherein said adhesion resistant agent powders are in the form of irregular, non-spherical, ground particles.

11. A method for preparing a chewing gum base to produce a less adherent discarded chewing gum product after being chewed, said method comprising adding an adhesion resistant agent selected from the group consisting of polyethylene, polypropylene, polytetrafluoroethylene, and polytrifluorochloroethylene to a base composition composed of a plasticizer and a gum component selected from the group consisting of chicle gum, polyvinyl acetate, polyisobutylene, jelutone rubber, ester gum and mixtures thereof, and heating the resulting mixture, said adhesion resistant agent being added in powder form to said base composition in an amount of between 2 to 50 parts by weight per 100 parts by weight of said base composition.

12. An article comprising a gum base having adherent properties, and a powder substance selected from the group consisting of a polyolefin and a fluorine-containing resin homogeneously admixed with said gum base, said powder substance being non-adherent with said base and encapsulating said gum base subsequent to mechanical application of force to the article.

13. A piece of chewing gum comprising a gum base having adherent properties, and means selected from the group consisting of a polyolefin and a fluorine-containing resin mixed with said base for covering said base with a non-adherent coating after cessation of chewing of the gum.

14. A chewable substance comprising a base having adherent properties and means selected from the group consisting of a polyolefin and a fluorine-containing resin mixed with said base for covering said base with a non-adherent coating after cessation of chewing of the substance.

15. A method comprising rendering a normally sticky chewable substance non-adherent after being chewed by adding to the chewable substance a non-adherent agent in powder form selected from the group consisting of polyolefins and fluorine-containing resins, said agent covering the surface of the sticky chewable substance after cessation of chewing to render the substance non-adherent.

References Cited by the Examiner
UNITED STATES PATENTS
3,159,491 12/1964 Mahan _____ 99—135

FOREIGN PATENTS
1,154,237 5/1962 Germany.

OTHER REFERENCES
Kresser, T.O.J. Polyethylene, New York, Reinhold Publishing Corp., 1957, page 105.

A. LOUIS MONACELL, *Primary Examiner.*

S. E. HEYMAN, *Assistant Examiner.*